United States Patent
Tsuchiya et al.

(10) Patent No.: US 7,335,126 B2
(45) Date of Patent: Feb. 26, 2008

(54) CONTINUOUSLY VARIABLE TRANSMISSION

(75) Inventors: Saoto Tsuchiya, Tokyo (JP); Masahiro Hasebe, Tokyo (JP); Norihiro Kai, Anjo (JP)

(73) Assignee: Kabushikikaisha Equos Research, Tokyo (JP)

( * ) Notice: Subject to any disclaimer, the term of this patent is extended or adjusted under 35 U.S.C. 154(b) by 236 days.

(21) Appl. No.: 11/358,056

(22) Filed: Feb. 22, 2006

(65) Prior Publication Data

US 2006/0189432 A1 Aug. 24, 2006

(30) Foreign Application Priority Data

Feb. 23, 2005 (JP) ............................. 2005-047823

(51) Int. Cl.
*F16H 37/02* (2006.01)

(52) U.S. Cl. ..................................................... 475/216

(58) Field of Classification Search ................ 475/215, 475/216
See application file for complete search history.

(56) References Cited

U.S. PATENT DOCUMENTS 5,607,372 A * 3/1997 Lohr ........................... 475/216

FOREIGN PATENT DOCUMENTS

WO 03/100295 12/2003

* cited by examiner

*Primary Examiner*—Dirk Wright
(74) *Attorney, Agent, or Firm*—Bacon & Thomas, PLLC (57) ABSTRACT

Rotation of an input shaft is directly transmitted to a front carrier of a planetary gear mechanism, and rotation, which is speed-changed and reversed by a toroidal-type continuously variable speed change unit, is transmitted to a first sun gear. When a Low clutch is applied, rotation of an output carrier of a simple planetary gear unit is transitted to a counter gear mechanism via a common carrier, and then output at an output shaft. When a High clutch H is applied, rotation of a second sun gear is transmitted to the output shaft. Thus, the pinion shaft is shortened and the service life span of a supporting bearing is increased as compared with a planetary gear mechanism that has a three-step pinion.

12 Claims, 11 Drawing Sheets

CONTINUOUSLY VARIABLE TRANSMISSION

BACKGROUND OF THE INVENTION

1. Field of the Invention

The present invention relates to a continuously variable transmission which provides a wider range of input/output speed ratios than does a conventional continuously variable speed-change unit, by combining a toroidal-type continuously variable speed change unit and a planetary gear mechanism with torque circulation.

2. Description of the Related Art

A continuously variable transmission which includes a toroidal-type continuously variable speed change unit and has all of its components arranged on a single axis is disclosed WO Publication WO03/100295A1. As shown in FIG. 6(a), this continuously variable transmission 1 includes a toroidal-type continuously variable speed change unit 5, a planetary gear mechanism 6, a counter gear mechanism 7, and a Low/High switching mechanism 10, all of which are arranged on a single axis between an input shaft 12 and an output shaft 13. The toroidal-type continuously variable speed change unit 5 includes input discs 2 and an output disc 3, as well as rollers 4 arranged between these discs such that the radial position of contact with the discs can be changed. The planetary gear mechanism 6 has a carrier C1 on which three pinions P1, P2, P3 are arranged axially spaced. The counter gear mechanism 7 has a carrier C2 on which two pinions P4, P5 are arranged axially spaced. The Low/High switching mechanism 10 includes a Low brake L that can be engaged to hold output side sun gear S4 of the counter gear mechanism against rotation, and a High clutch H interposed between a second sun gear (i.e., a High mode output gear) S2 of the planetary gear unit and the output shaft 13.

Accordingly, when the continuously variable transmission 1 is in a Low mode in which the Low brake L is engaged and the High clutch H is released, rotation of the carrier C1 into which rotation is directly input from the input shaft 12 combines, in the planetary gear mechanism 6, with the rotation of an input side sun gear S1, the direction of which has been reversed and the speed of which has been changed, via the continuously variable speed change unit 5. This combined rotation is then output to a Low mode output gear (i.e., a third sun gear) S3. The rotation of the output gear S3 is then reversed and output to the output shaft 13.

The Low/High switching mechanism 10 may alternatively include a Low clutch L interposed between the carrier C2 and the output shaft 13, as shown in FIG. 6(b), and a High clutch H interposed between the second sun gear S2 of the planetary gear unit and the output shaft 13 like that described above.

In the continuously variable transmission shown in FIG. (6(a), the three pinions P1, P2, P3 of the planetary gear mechanism 6 are axially aligned in series. In addition, the two pinions P4, P5 of the counter gear mechanism 7 are also axially aligned. As a result, the continuously variable transmission has a long axial dimension.

SUMMARY OF THE INVENTION

The present invention provides a continuously variable transmission which overcomes the foregoing problems by providing a simple planetary gear unit for a Low mode. More specifically, the present invention provides a continuously variable transmission which includes a main planetary gear mechanism with a two-step pinion in combination with a simple planetary gear unit. The pinion shaft is relatively short but sufficiently long to support an axial array of pinions. As a result, the bearing which rotatably supports the pinions can be larger in diameter, which increases the length of the bearing service life and reduces bending of the pinion shaft and thus reduces the load fluctuation on the bearing that results from such bending. Further, the pinion weight is lightened such that the load caused by centrifugal force is reduced. The combination of these factors improves the precision with which the pinions are supported and enables that high precision to be maintained over an extended period of time.

Preferably, a Low mode is established by a simple planetary gear unit, which makes it easier to set the gear ratio for an infinitely variable transmission (IVT). Also, increasing the number of teeth of the pinion of the first carrier of the main planetary gear mechanism makes it possible to maintain the gear strength with a small tooth width and to shorten the axial dimension of the planetary gear mechanism so that the continuously variable transmission can be made more compact.

Further, the input shaft and the input disc of the toroidal speed change unit are connected to the first carrier, the output disc of the toroidal speed change unit is connected to the first sun gear, and the central portion of the toroidal speed change unit is provided with two heavy shafts, thus resulting in compact and logical connecting relationships.

Additionally, the present invention further provides a continuously variable transmission which includes the main planetary gear mechanism which has a first carrier connected to a ring gear of the simple planetary gear unit and a second sun gear connected to the sun gear of the simple planetary gear unit. As a result, the connections are short and logical so that the axial length of the planetary gear mechanism is shorter, thereby enabling the continuously variable transmission to be made more compact as well as more reliable.

According to the preferred embodiment of the present invention, the counter gear mechanism is a double pinion planetary gear unit. As a result, the counter gear mechanism can be made axially shorter, thus making the continuously variable transmission even more compact, especially in its axial dimension.

Preferably, the carrier of the single planetary gear set of the main planetary gear mechanism is formed integral with the carrier of the counter gear mechanism. As a result, the planetary gear mechanism and the counter gear mechanism are inseparably connected together so as to form an overall compact and simple mechanism, thus enabling the continuously variable transmission to be more compact and reliable.

The above-described toroidal-type continuously variable speed change unit, including the input shaft which is substantially integral with the input disc of the toroidal-type continuously variable speed change unit and the carrier of the planetary gear mechanism, receives a large force (thrust) but is supported in such a manner that the thrust is cancelled out. Further, the continuously variable speed change unit and the first and second sun gears are supported in a manner such that the thrust, including the thrust that acts on the first and second sun gears, is cancelled out. Stated differently, the toroidal-type continuously variable speed change unit and the planetary gear mechanism are integrated into a single unit in a manner such that overall thrust is cancelled out, which enables highly precise support to be maintained over an extended period of time, thus increasing the effective service life of the continuously variable transmission.

In addition, in the above described preferred embodiments, the thrust generated by the helical gears in the planetary gear mechanism is canceled out in the planetary gear mechanism by the first thrust bearing interposed between the first sun gear and the first carrier and the second thrust bearing interposed between the first carrier and the sun gear of the simple planetary gear unit. Therefore, need for a thrust bearing between the first carrier and the second sun gear is eliminated so that the number of thrust bearings can be reduced, and the continuously variable transmission can be made more compact in its axial dimension.

The present invention also relates to a continuously variable transmission in which an input shaft and an output shaft are arranged on the same axis.

BRIEF DESCRIPTION OF THE DRAWINGS

FIGS. 6(a) and 6(b) are schematic views of the related art;

DESCRIPTION OF THE EMBODIMENTS

Figure 7:
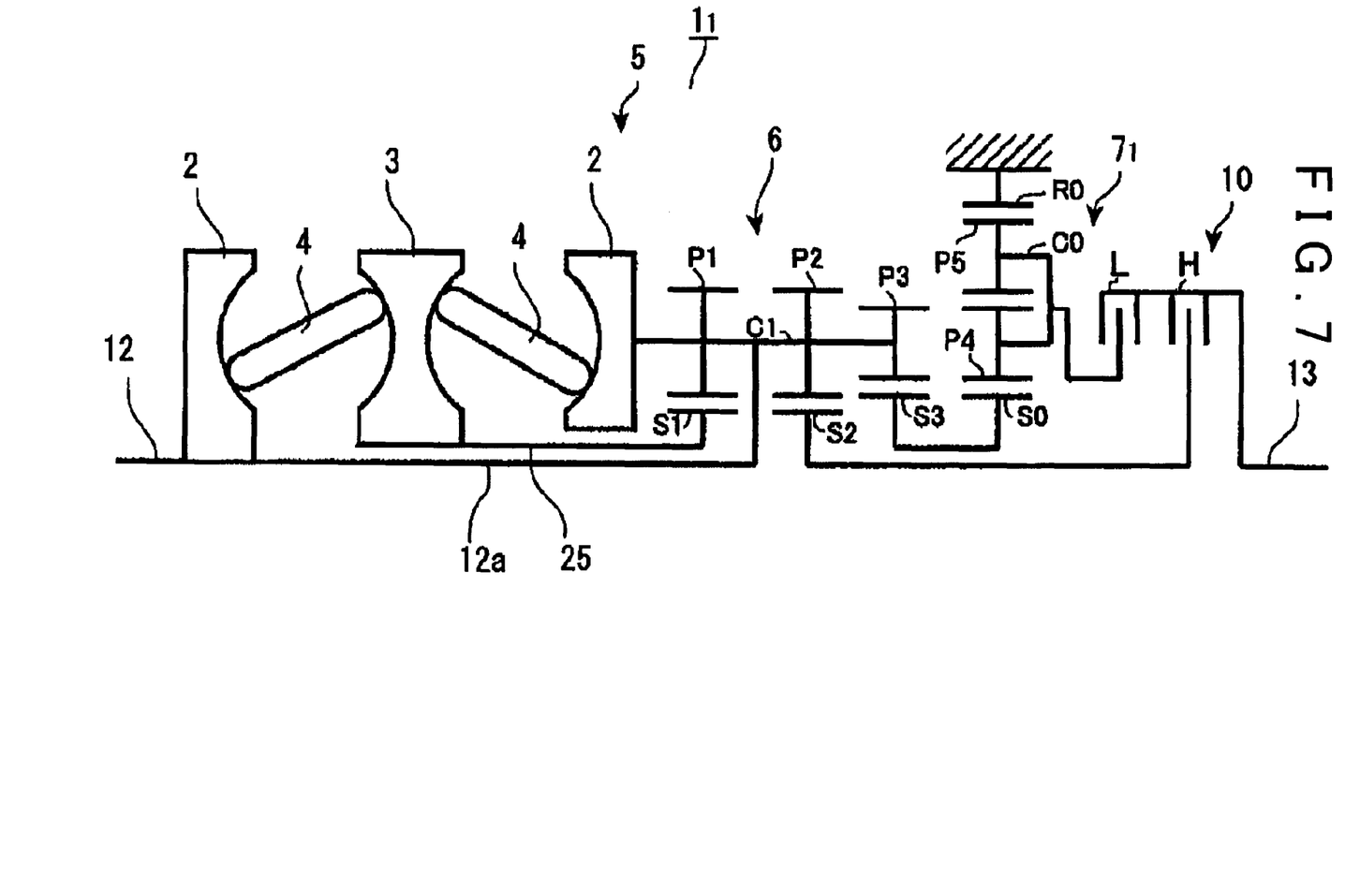
FIG. 7 is a schematic view of another embodiment.

FIG. 7 shows an embodiment of a continuously variable transmission in which the length of the axial dimension is decreased by using a double pinion planetary gear set for the counter gear mechanism. As shown in FIG. 7, this continuously variable transmission $1_1$ includes a toroidal-type continuously variable speed change unit (CVCU) 5 and a planetary gear mechanism 6, which are similar to those described in connection with the "related art", and a counter gear mechanism $7_1$ which is a double pinion planetary gear unit. That is, a carrier C0 rotatably supports pinions P4, P5 which are in mesh with each other, while one pinion P4 is in mesh with a sun gear S0 and the other pinion P5 is in mesh with a ring gear R0. The sun gear S0 is connected to the third sun gear (i.e., the Low mode output gear) S3 of the planetary gear mechanism 6, the ring gear R0 is fixed to case 15, and the carrier C0 is coupled to the output shaft 13 via the Low clutch L.

Figure 8A:
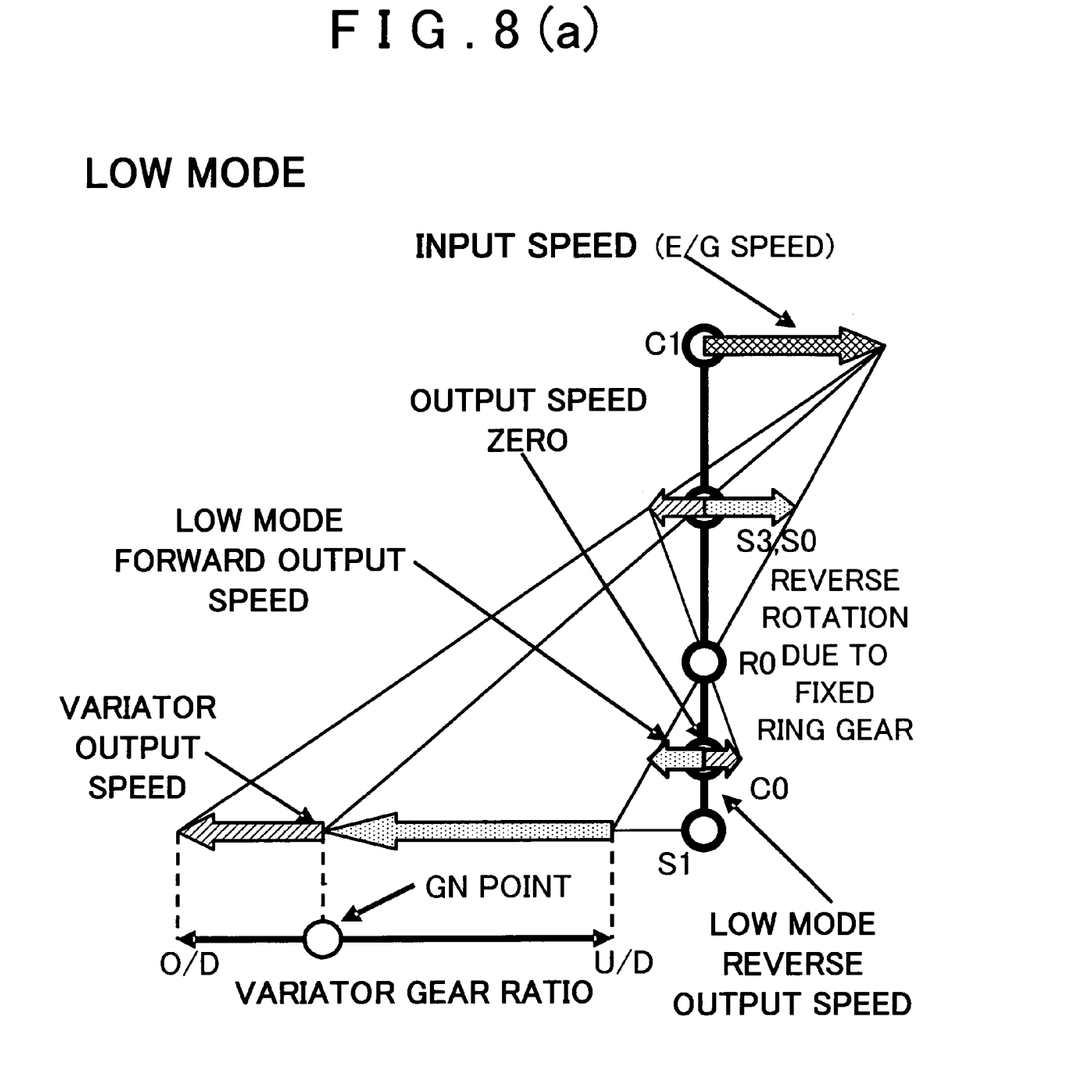
FIGS. 8(a) and 8(b) are velocity diagrams, of a Low mode and a High mode, respectively, for the embodiment of FIG. 7.

The continuously variable transmission $1_1$ (FIG. 7) operates as illustrated in the velocity diagram of FIG. 8. That is, in a Low mode in which the Low clutch L is applied and the High clutch H is released, rotation of the input shaft 12 (e.g., engine output rotation) is transmitted to the carrier C1 of the planetary gear mechanism 6 via a hollow shaft 12a and is reversed and transmitted to a first sun gear (i.e., an input gear) S1 via a toroidal-type continuously variable speed change unit (CVCU) 5. The rotation input to the carrier C1 and the reversed speed-changed rotation of the input gear S1 are combined while torque is circulated at the planetary gear mechanism 6, and then output from the third sun gear (i.e., the Low mode side output gear) S3.

Here, because of the relationship between the input side gear ratio (S1/P1) and the output side gear ratio (S3/P3), when the continuously variable speed change unit (CVCU) 5 is at maximum overdrive (OD: the speed increase side), the output gear S3 rotates in the reverse direction (with the direction of rotation of the input shaft 12 being the forward direction). When the CVCU 5 shifts from OD to underdrive (UD: the speed decrease side), the output gear S3 passes through the zero rotation (GN: gear neutral) point and starts to rotate in the forward direction. When the CVCU 5 is at maximum underdrive, maximum forward rotation is obtained.

The rotation of the output gear S3 is transmitted to the input sun gear S0 of the counter gear mechanism $7_1$, which is integrated with the output gear S3. That rotation is then reversed because the ring gear R0 is stationary, and output from the carrier C0. The rotation of the carrier C0 is then transmitted to the output shaft 13 via the Low clutch L which is applied. Therefore, the reverse rotation of the output gear S3 becomes forward rotation at the carrier C0 and the output shaft 13. When the continuously variable transmission $1_1$ is used as a transmission in an automobile, however, another counter mechanism, not shown, is provided in the form of a differential mechanism on the downstream side in the transmission path of the continuously variable transmission $1_1$, so the forward rotation of the output shaft 13 actually becomes reverse drive for the vehicle. That is, when the CVCU 5 changes from OD to UD, the output shaft (i.e., the carrier C0) 13 passes through the GN point (i.e., zero rotation) and shifts to forward rotation.

Figure 8B:
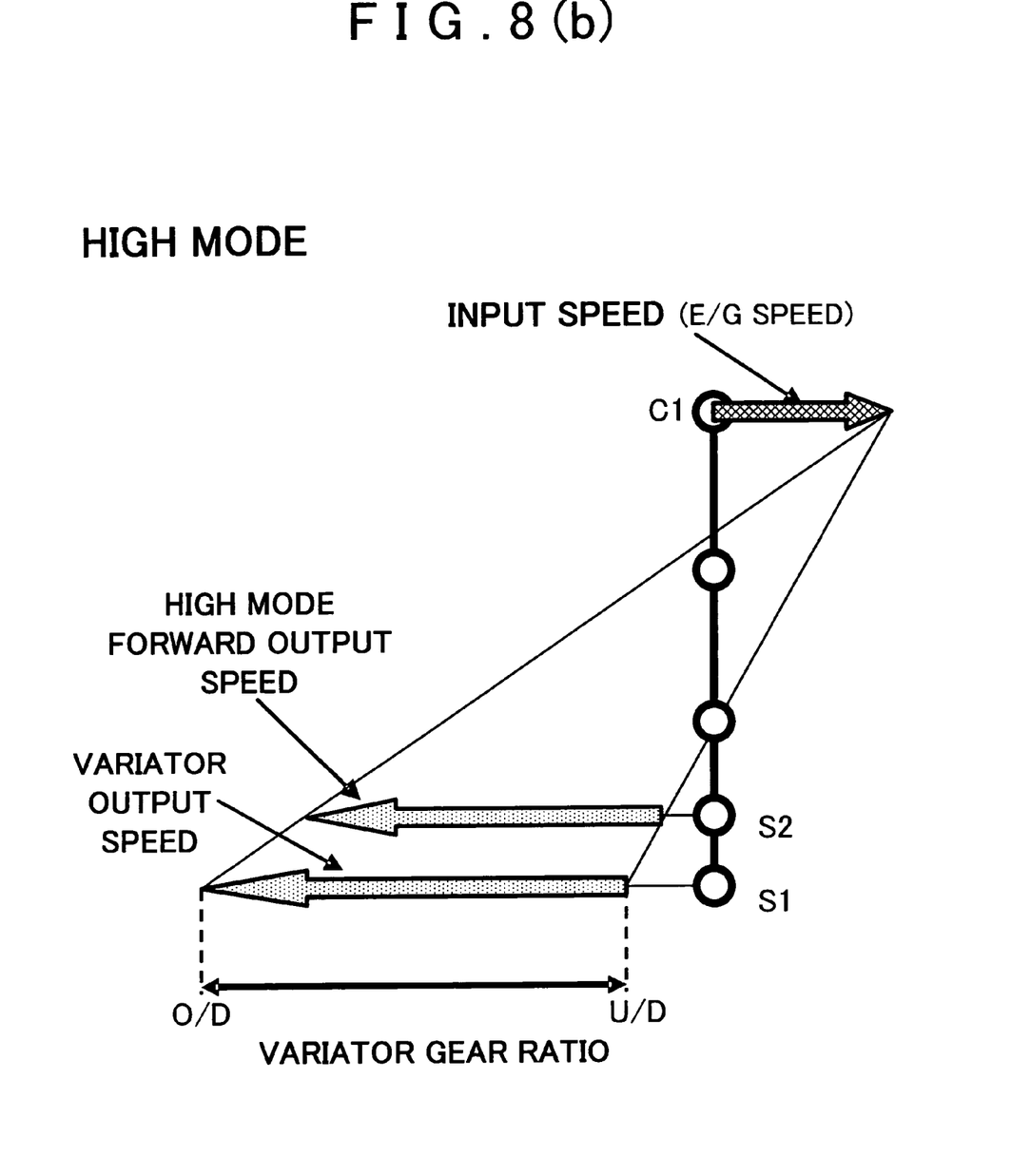

The mode switches from Low mode to High mode when the Low clutch L is released and the High clutch H is applied. In this state, rotation of the second sun gear (i.e., the High mode output gear) S2 of the planetary gear mechanism 6 is output directly from the output shaft 13 via the High clutch H. As shown in FIG. 8(b), rotation of the input shaft 12 is directly transmitted to the carrier C1 of the planetary gear mechanism 6, as well as reversed and transmitted to the first sun gear (i.e., the input gear) S1 via the CVCU 5.

The forward rotation of the carrier C1 is combined with the reversed speed-changed rotation of the first sun gear S1 in the planetary gear mechanism 6, and that combined rotation is output from the second sun gear S2. Here, the input side gear ratio (S1/P1) and the output side gear ratio (S2/P2) are values that are close or the same so an output speed is obtained in which the speed ratio (i.e., the gear ratio) of the CVCU is off in the reverse direction by a value that substantially corresponds to the forward output speed at maximum UD of the CVCU 5 in the Low mode. That is, when the CVCU 5 is at maximum UD, the second sun gear (i.e., the output gear) S2 is at the lowest forward output speed in the High mode. As the CVCU 5 shifts from the UD side to the OD side, that forward output speed increases. Incidentally, the reverse rotation here actually results in forward drive of the vehicle because of the other counter mechanism.

Accordingly, when the continuously variable transmission $1_1$ is in the Low mode and the CVCU 5 is at maximum OD, maximum reverse speed is obtained. As the CVCU 5 shifts to the UD side, it passes through the gear neutral (GN) point, after which forward rotation is obtained and the speed increases in the forward direction until the maximum forward output speed in the Low mode is reached when the CVCU 5 is at the maximum UD position. When the continuously variable transmission $1_1$ is switched to the High mode in this state and the CVCU 5 is at the maximum UD position, the lowest forward output speed in the High mode is obtained. The lowest output speed in the High mode is substantially the same as the highest output speed in the Low mode. In the High mode, the forward output speed also increases as the CVCU 5 shifts in the OD direction, such that maximum forward output speed is achieved when the CVCU 5 is at the maximum OD position.

Accordingly, in the continuously variable transmission $1_1$, when the CVCU 5 shifts from the OD side to the UD side, rotation shifts from reverse rotation to forward rotation after passing through neutral gear. Then, when the CVCU shifts from the maximum UD position toward OD, rotation continues in the forward direction and continues to increase until the maximum output speed is reached.

The continuously variable transmission $1_1$ shown in FIG. 7 described above is reduced in its axial dimension by using a double pinion planetary gear unit as the counter gear mechanism. The planetary gear mechanism 6 for combining torque has three pinions that are axially aligned (i.e., a three-step pinion), as in the continuously variable transmission 1 shown in FIG. 6.

Figure 9:
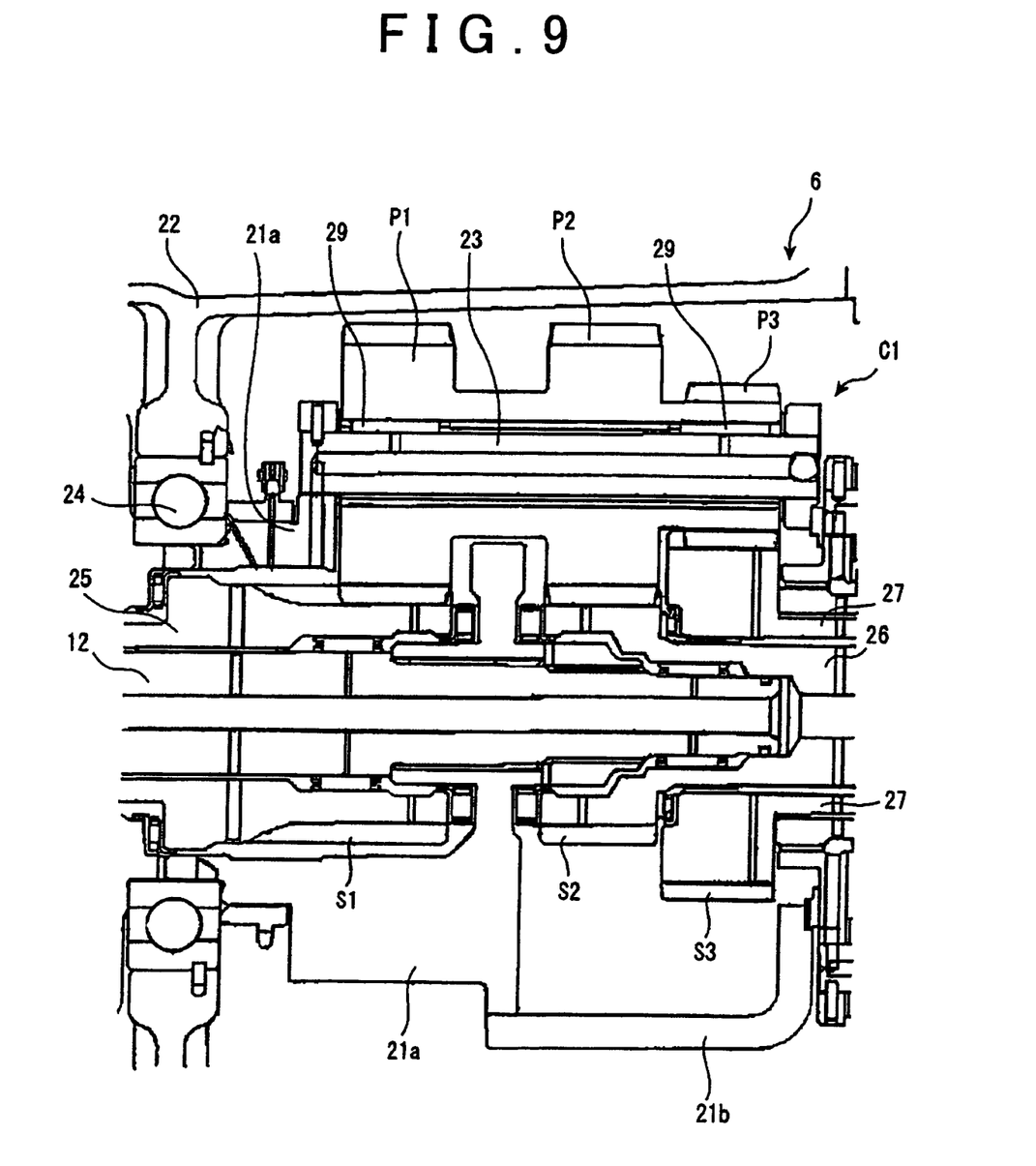
FIG. 9 is a sectional view of a main portion of the embodiment of FIG. 7.

As shown in FIG. 9, the planetary gear mechanism 6 has the carrier C1 which supports serially, arranged along the axis, the three pinions P1, P2, P3, a first sun gear (i.e., the input gear) S1 which is in mesh with the first pinion P1, a second sun gear (i.e., the High mode output gear) S2 which is in mesh with the second pinion P2, and a third sun gear (i.e., the Low mode output gear) S3 which is in mesh with the third pinion P3. The carrier C1 has a carrier main body 21a, which is formed integrally with one of the discs 2 of the CVCU 5, and a carrier cover 21b which is integrally formed with the carrier main body 21a. The carrier main body 21a is rotatably supported by transmission case 22 via a bearing 24. Also, a pinion shaft 23 is supported by the carrier main body 21a and the cover 21b. The first, second, and third pinions P1, P2, P3, which are integrally formed, are rotatably supported via either a needle bearing 29 or a bushing on the pinion shaft 23. As used herein the term "bearing" is intended to include bushings.

The first sun gear S1 is formed at an end portion of a hollow shaft 25, the base portion of which is coupled to the central output disc 3 of the CVCU 5 (see FIGS. 6 and 7). An input shaft (central shaft) 12 is rotatably supported via a needle bearing or the like within (concentric with) the hollow shaft 25. The base end (toward the front of the vehicle) of this input shaft 12 is coupled to an engine output shaft via a damper, while the rear end of the vehicle) of the input shaft 12 is spline-engaged with the carrier main body 21a. The second sun gear S2 is formed on an intermediate shaft 26 which is connected to the High clutch H of the Low/High switching mechanism (see FIGS. 6 and 7). The third sun gear S3 is formed on a sleeve 27 which is rotatably fitted around the intermediate shaft 26. This sleeve 27 is connected to the sun gear S0 of the counter gear mechanism 7 (see FIGS. 6 and 7).

The fact that the pinion shaft 23 supports all three pinions P1, P2, P3 which are integrally formed serially along its axis requires that the pinion shaft 23 have a long axial dimension, and as described above, because it makes up an IVT (infinitely variable transmission) with torque circulation, i.e., because it performs continuously variable shifting, with the highest forward output speed in the Low mode approximately matching the lowest forward output speed in High mode when the CVCU 5 is at maximum UD, the gear diameter of the third pinion P3 is smaller, which means the diameter of the pinion shaft 23 must also be smaller.

However, because in this embodiment the diameter of the bearing 29 is reduced, it will necessarily have a shorter life span. Further, the reduced diameter of the pinion shaft renders the pinion shaft insufficiently rigid, making it susceptible to bending which would increase the load on the bearing. The combination of these factors may result in insufficient precision and life span of the carrier C1.

Moreover, the three pinions P1, P2, P3 which are formed integral with one another impose a heavy centrifugal load on the carrier C1.

Also, because the three pinions P1, P2, P3 are axially aligned in series, the planetary gear mechanism 6 has a long axial dimension such that, even if the counter gear mechanism were shortened, the axial dimension is undesirably long for a continuously variable transmission.

Now, a preferred embodiment of an infinitely variable transmission (IVT) $1_2$, which improves upon the previously described embodiment, will be described with reference to FIGS. 1 to 5.

Figure 1:
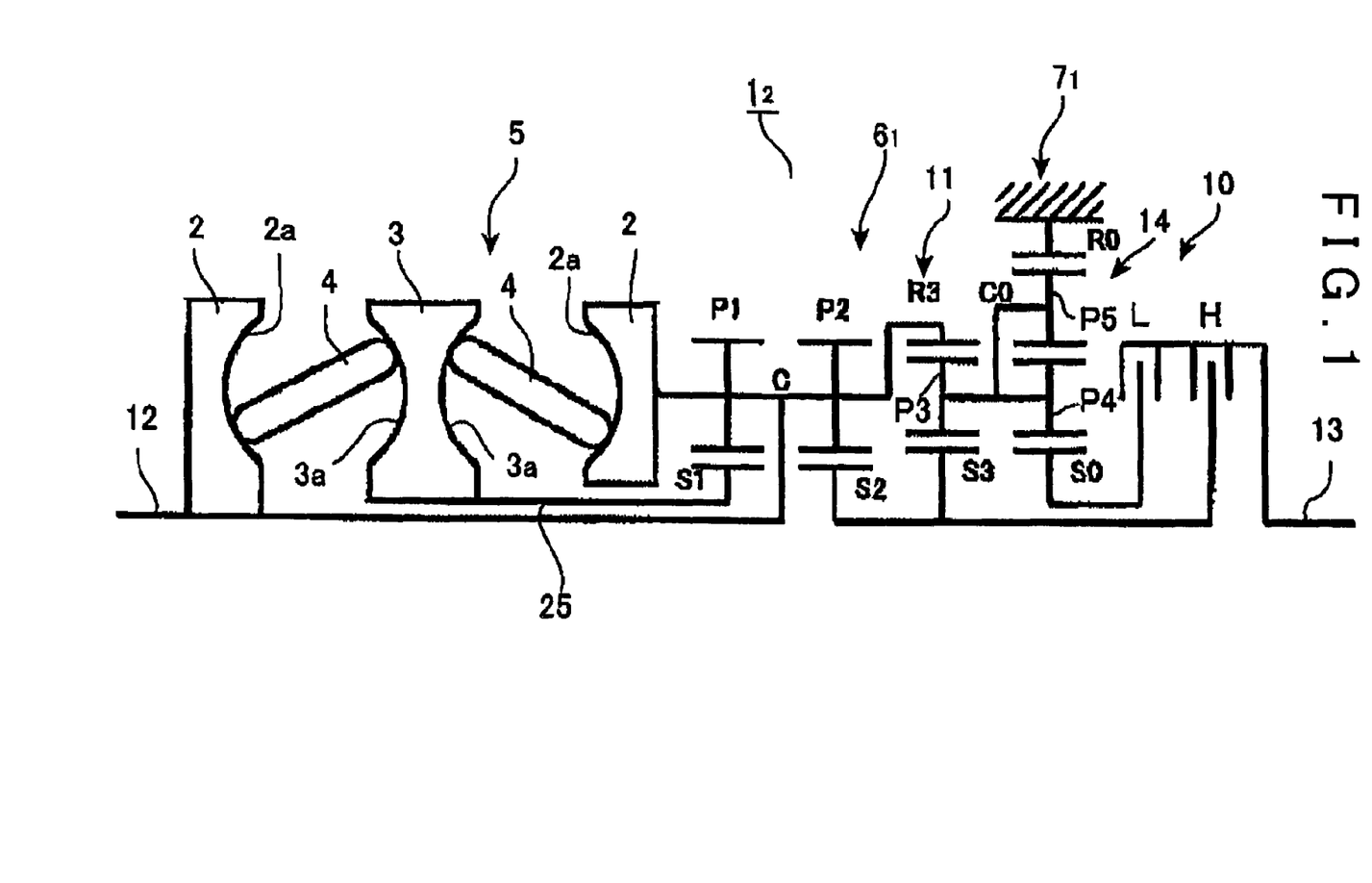
FIG. 1 is a schematic view of an embodiment of an infinitely variable transmission (IVT) according to the present invention.

The infinitely variable transmission (IVT) $1_2$ includes a continuously variable speed change unit (CVCU) 5, a planetary gear mechanism $6_1$, a counter gear mechanism $7_1$, and a Low/High switching mechanism 10, as shown in FIG. 1. The (CVCU) 5 is a full toroidal-type continuously variable speed change unit and includes two input discs 2, 2 connected to an input shaft 12, one output disc 3 connected to a hollow shaft 25, and power rollers 4, 4 that are sandwiched between the input discs and the output disc. The input discs 2 and the output disc 3 have arc-shaped concave grooves 2a, 3a that form part of a circle and which face each other so as to form two cavities that sandwich two circumferential arrays (rows) of power rollers, such that the thrust from one of the input discs is cancelled out by the thrust from the other input disc. The power rollers 4, 4 are tilted by shifting them in a direction perpendicular to the shaft, and shifting is performed continuously and steplessly by changing the effective radius of contact between the input discs 2 and the output disc 3. This CVCU 5 has a speed ratio (i.e., output speed/input speed) of −0.4 to −2.5. The speed ratio is negative (minus) because the output disc 3 rotates in a direction the opposite of the direction of rotation of the input discs 2.

The planetary gear mechanism $6_1$ includes a front carrier (i.e., a first carrier) C which has two pinions P1, P2, and a Low mode simple planetary gear unit 11. This Low mode simple planetary gear unit 11 includes a rear carrier C0 which is shared in common with a double pinion planetary gear unit 14 of the counter gear mechanism $7_1$. The two pinions (i.e., the first pinion and the second pinion) P1, P2 are integrally formed and are rotatably supported on a common pinion shaft. The front carrier C which supports these pinions is connected to a ring gear R3 of the Low mode simple planetary gear unit 11. The front carrier C is connected to the input shaft 12 as well as to one of the input discs 2, to transmit rotation of the input shaft 12.

The first pinion P1 is in mesh with the first sun gear S1 that is connected to the output disc 3 of the CVCU 5. This first sun gear S1 serves as an input gear into which speed-changed rotation from the CVCU 5 is input. The second pinion P2 is in mesh with the second sun gear S2 which serves as a High mode output gear. The second pinion P2 is also integrally connected to a (third) sun gear S3 of the Low mode simple planetary gear unit 11. These second and third sun gears S2, S3 are both connected to the output shaft 13 via a High clutch H of the Low/High switching mechanism 10 and thus serve as High mode output gears.

The counter gear mechanism $7_1$ includes a double pinion planetary gear unit 14 that has two pinions (a fourth pinion P4 and a fifth pinion P5) which are in mesh with each other. The carrier C0 of the double pinion planetary gear unit 14 is shared in common with the Low mode simple planetary gear unit 11, as described above. A (second) ring gear R0 is fixed to case 22, and a (fourth) sun gear S0 is connected to the output shaft 13 via a Low clutch L.

Figure 2A:
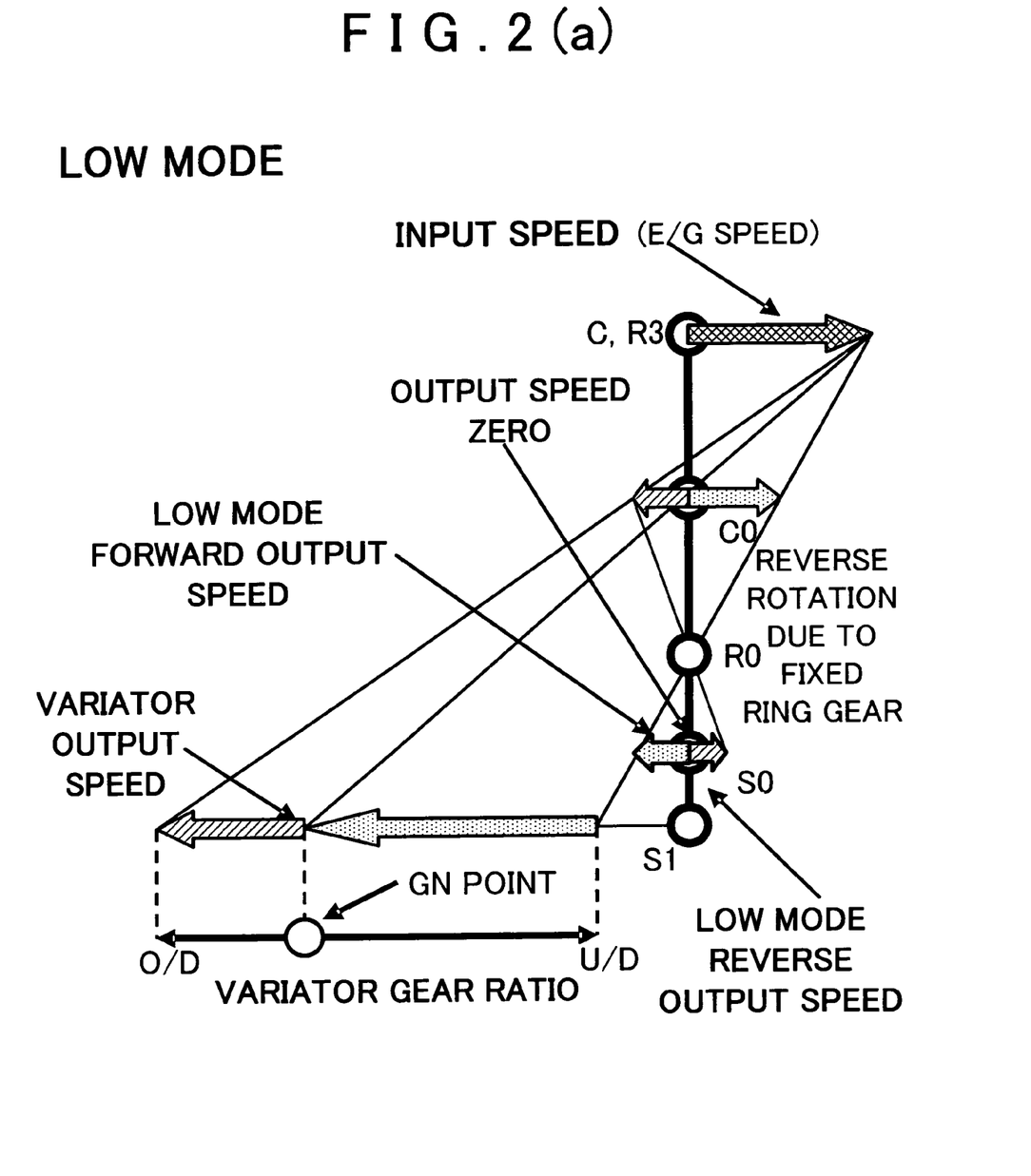
FIG. 2(a) is a velocity diagram illustrating a Low mode and FIG. 2(b) is a velocity diagram illustrating a High mode.
Figure 2B:
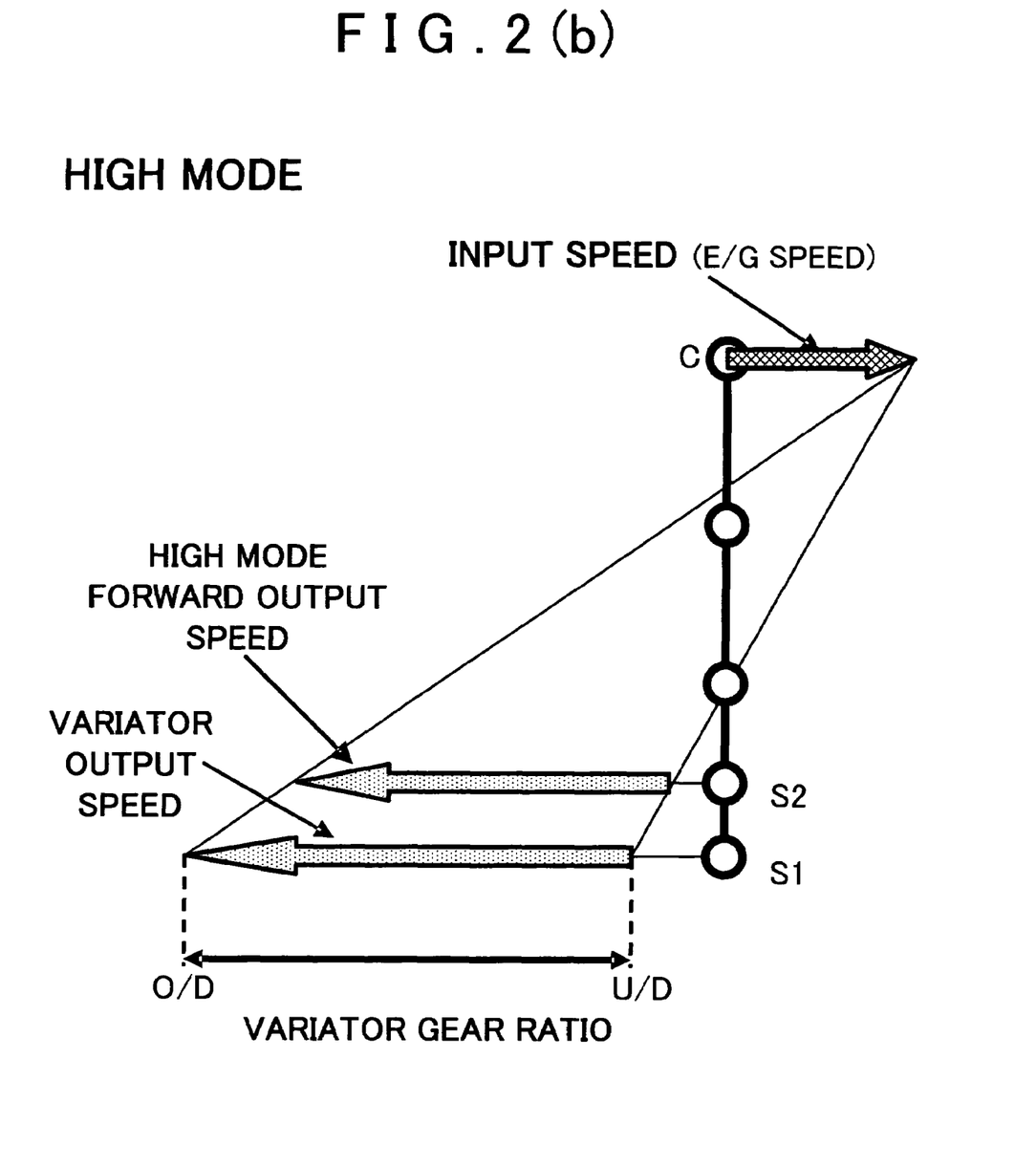

The infinitely variable transmission (IVT) $1_2$ operates as illustrated in the velocity diagram in FIG. 2. In the velocity diagram in FIG. 2, the first and second pinions P1, P2 are common long pinions, the gear ratios S1/P1 and S2/P2 are changed, and the output speed and the CVCU output line do not overlap. However, the gear ratios (S1/P1) (S2/P2) may be the same and the output speed and the CVCU output line may of course overlap.

In the Low mode in which the Low clutch L is applied and the High clutch H is released, as shown in FIG. 2(a), the rotation of the input shaft 12 which is connected to the engine output shaft is transmitted directly to the front carrier C and the ring gear R3 of the main planetary gear mechanism $6_1$, and reversed and speed-changed rotation is transmitted to the first sun gear (i.e., the input gear) S1 via the CVCU 5. The rotation of the front carrier C and the ring gear R3 and the speed-changed rotation (i.e., the CVCU speed ratio) of the first sun gear S1 are combined while torque is circulated at the planetary gear mechanism $6_1$ and the resultant rotation is output to the output carrier C0 of the Low mode simple planetary gear unit. Here, when the CVCU 5 shifts from the OD side to the UD side, the output carrier C0 changes from reverse rotation to the neutral gear position (GN point), i.e., a position at which the output speed becomes zero and torque is endlessly released. When the CVCU 5 shifts farther to the OD side, rotation of the output carrier C0 accelerates in the forward direction (i.e., the same direction as that in which the input shaft rotates).

The rotation of the output carrier C0 is directly transmitted to the carrier of the counter gear mechanism $7_1$. This rotation is then reversed, because the ring gear R0 is held stationary, and output from the sun gear S0. As a result, the rotation of the output carrier C0 is reversed. Reverse rotation of the output carrier C0 is output as a reverse output speed to the sun gear S0 and forward rotation of the output carrier C0 is output as a forward output speed to the sun gear S0.

The mode switches from Low mode to High mode when the Low clutch L is released and the High clutch H is applied. In this state, rotation of the input shaft 12 is transmitted directly to the front carrier C of the main planetary gear mechanism $6_1$, while reversed speed-changed rotation is transmitted to the first sun gear S1 from the CVCU 5. These two rotations are then combined by the planetary gear mechanism $6_1$ and output from the second sun gear S2 which serves as the High mode output gear. At this time, the sun gear S0 and the carrier C0 of the counter gear mechanism $7_1$ rotate idly because the Low clutch L is released. Therefore, the ring gear R3 of the planetary gear mechanism $6_1$ also rotates idly. Also, the gear ratios S1/P1 and S2/P2 have close or the same values, so a rotational speed that is close to or the same as the speed-changed output rotational speed from the CVCU 5 (i.e., the CVCU gear ratio) is output from the second sun gear S2, and the CVCU gear ratio is output as a High mode forward output speed from the output shaft 13 because the High clutch H is applied.

The foregoing will now be explained with the graph in FIG. 3. That is, when the speed ratio (i.e., output speed/input speed) of the CVCU 5 is at the OD end, (approximately −2.5), the infinitely variable transmission (IVT) $1_2$ rotates at a predetermined speed ratio (approximately 0.25) in the forward direction (i.e., the positive direction). As the CVCU 5 shifts steplessly (continuously) to the UD side, the speed ratio of the IVT $1_2$ steplessly decreases until the speed ratio of the IVT $1_2$ becomes 0, i.e., reaches the neutral gear (GN) point, at a speed ratio near −1.8 of the CVCU 5. Then, when the CVCU 5 shifts toward UD, the speed ratio of the IVT $1_2$ continuously accelerates in the reverse direction (i.e., the negative direction). When the CVCU 5 reaches the UD end (approximately −0.4), the speed ratio of the IVT $1_2$ is approximately −0.5, at which point the mode switches to the High mode. When the speed ratio of the CVCU 5 is at the UD end in the High mode, the speed ratio of the IVT $1_2$ is the same value (i.e., approximately −0.5) that it was in the Low mode. Now however, when the speed ratio of the CVCU shifts from the UD end toward OD, the speed ratio of the IVT $1_2$ accelerates steplessly in the reverse direction (i.e., the negative direction) from the Low mode. The acceleration in the reverse direction continues as the CVCU 5 shifts farther toward OD. When the speed ratio of the CVCU 5 reaches the OD end (approximately −2.5), the speed ratio of the IVT $1_2$ is approximately −2.75 which is the maximum speed ratio.

Figure 3:
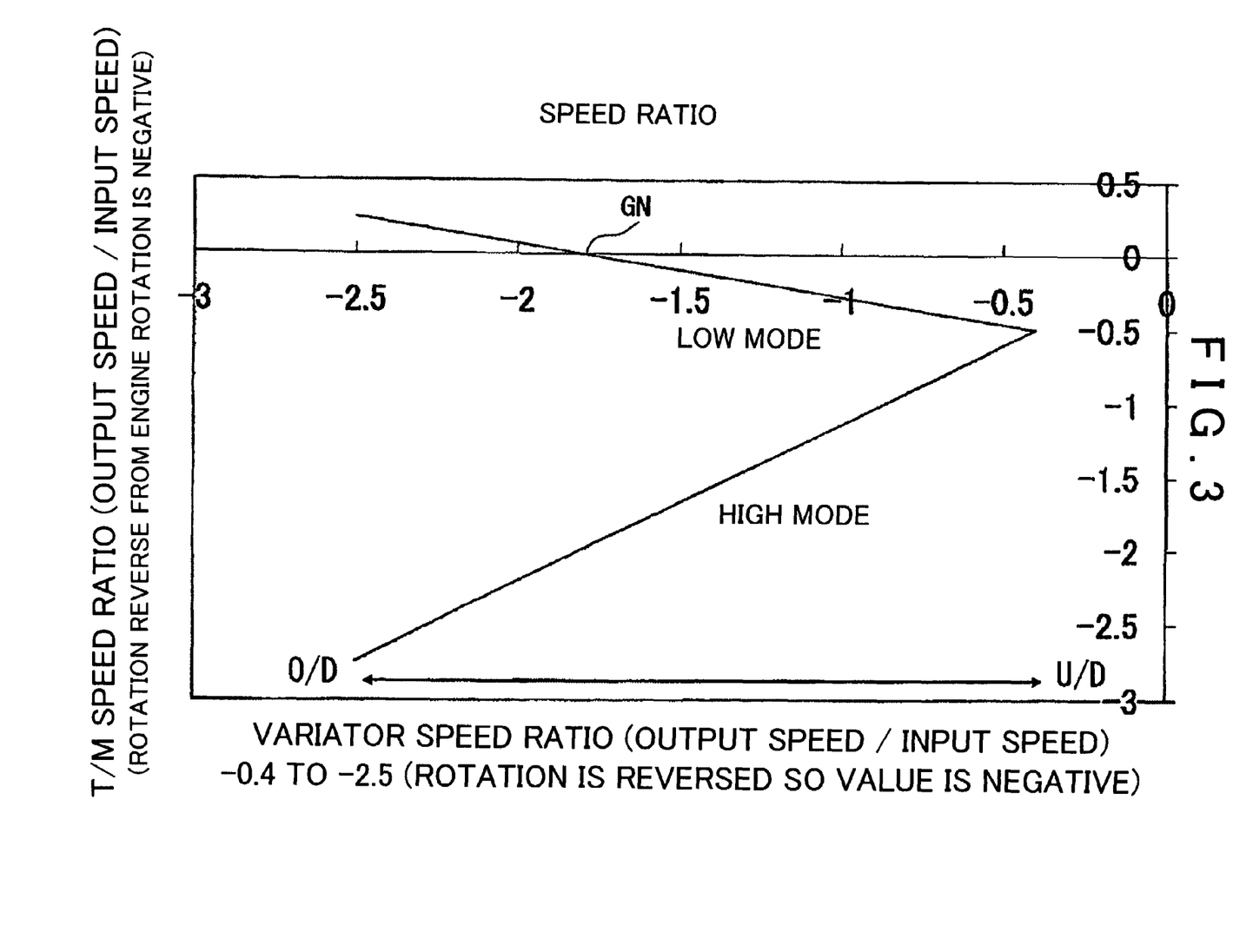
FIG. 3 is a graph showing the relationship between the speed ratio of a continuously variable speed change unit and the speed ratio of the continuously variable transmission in the IVT of FIG. 1.

In the graph of FIG. 3, the direction of rotation of the input shaft 12 (i.e., the direction of engine rotation) is the forward direction, so the speed ratio is denoted with a plus sign. Accordingly, the CVCU 5 rotates in reverse due to the toroidal system, so its speed ratio is negative. Because this infinitely variable transmission (IVT) $1_2$ is used in a vehicle where rotation is reversed again by a counter gear in a differential mechanism, the vehicle travels in reverse when the speed ratio of the IVT $1_2$ is positive, and forward when the speed ratio is negative. Accordingly, when the CVCU shifts from the OD end toward UD end in the Low mode, the vehicle changes from reverse travel to forward travel with passage through neutral gear (GN). The vehicle then gradually accelerates and the mode switches to the High mode at the UD end of the CVCU 5. When the CVCU 5 shifts from the UD end toward OD, the vehicle steplessly (continuously) accelerates in the forward direction.

Figure 4:
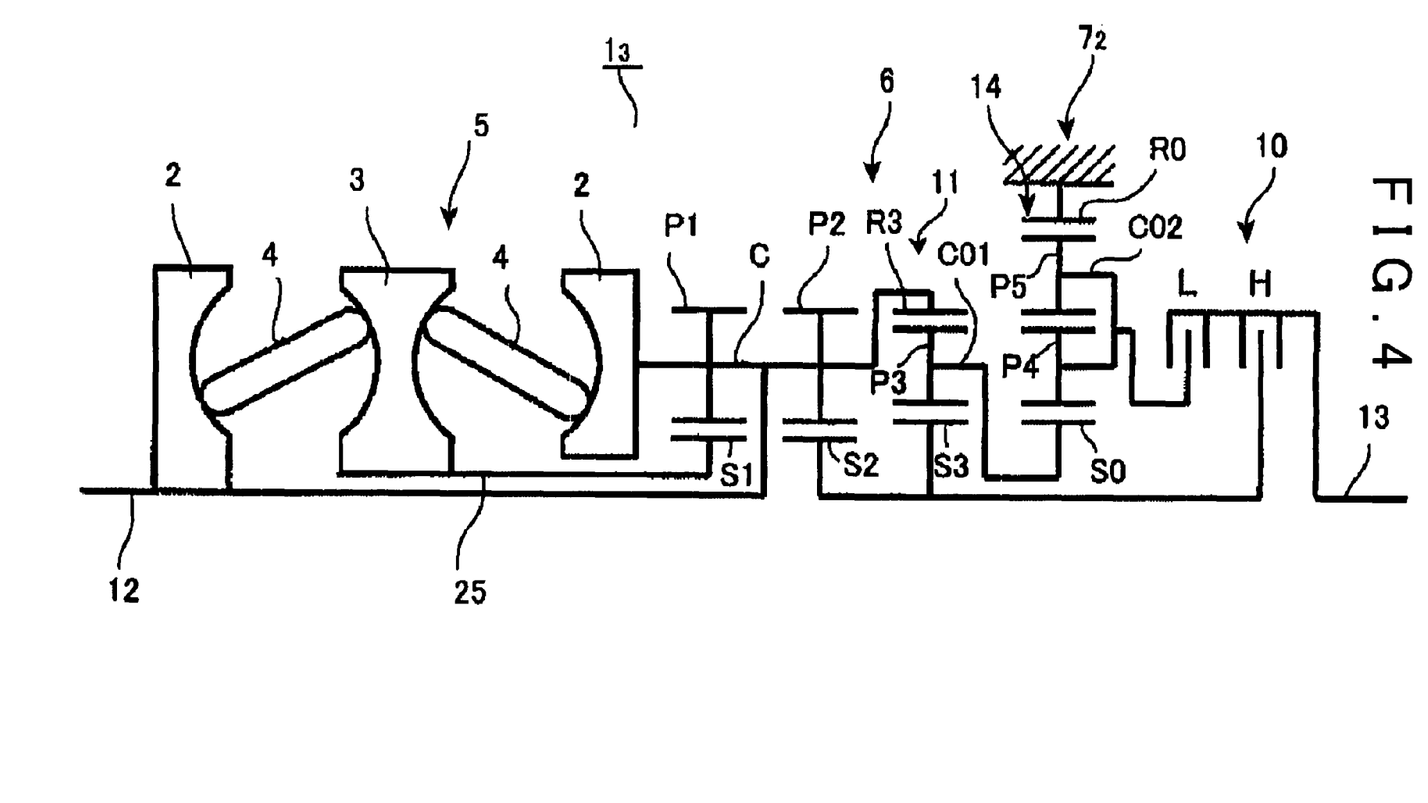
FIG. 4 is a schematic view as a modification of the embodiment of FIG. 1.

FIG. 4 shows an infinitely variable transmission $1_3$ of which a portion of $1_1$ has been modified. In this infinitely variable transmission $1_3$, the structures of the continuously variable speed change unit (CVCU) 5, the planetary gear mechanism $6_1$, and the counter gear mechanism $7_1$ are similar to those of the previous embodiment, but the connections between the planetary gear mechanism $6_1$ and the counter gear mechanism $7_1$ are different. That is, the carrier C01 of the Low mode simple planetary gear unit 11 is connected to the sun gear S0 of the counter planetary gear 14 and the carrier C02 of the counter planetary gear unit 14 is connected to the output shaft 13 via the Low clutch L.

In this embodiment, when the Low mode output carrier C0 is replaced with the sun gear S0 and the output element S0 is replaced with the carrier C02 in FIG. 2, the velocity diagram is the same as the velocity diagram shown in FIG. 2. That is, in the Low mode, the rotation of the output carrier C01 is input to the sun gear S0 of the counter gear mechanism $7_2$. That rotation is then reversed because the ring gear R0 is fixed, and output from the carrier C02 to the output shaft 13. In the counter gear mechanisms $7_1$, $7_2$, a Low brake that can hold the ring gear R0 stationary may be used instead of the Low clutch.

Figure 5:
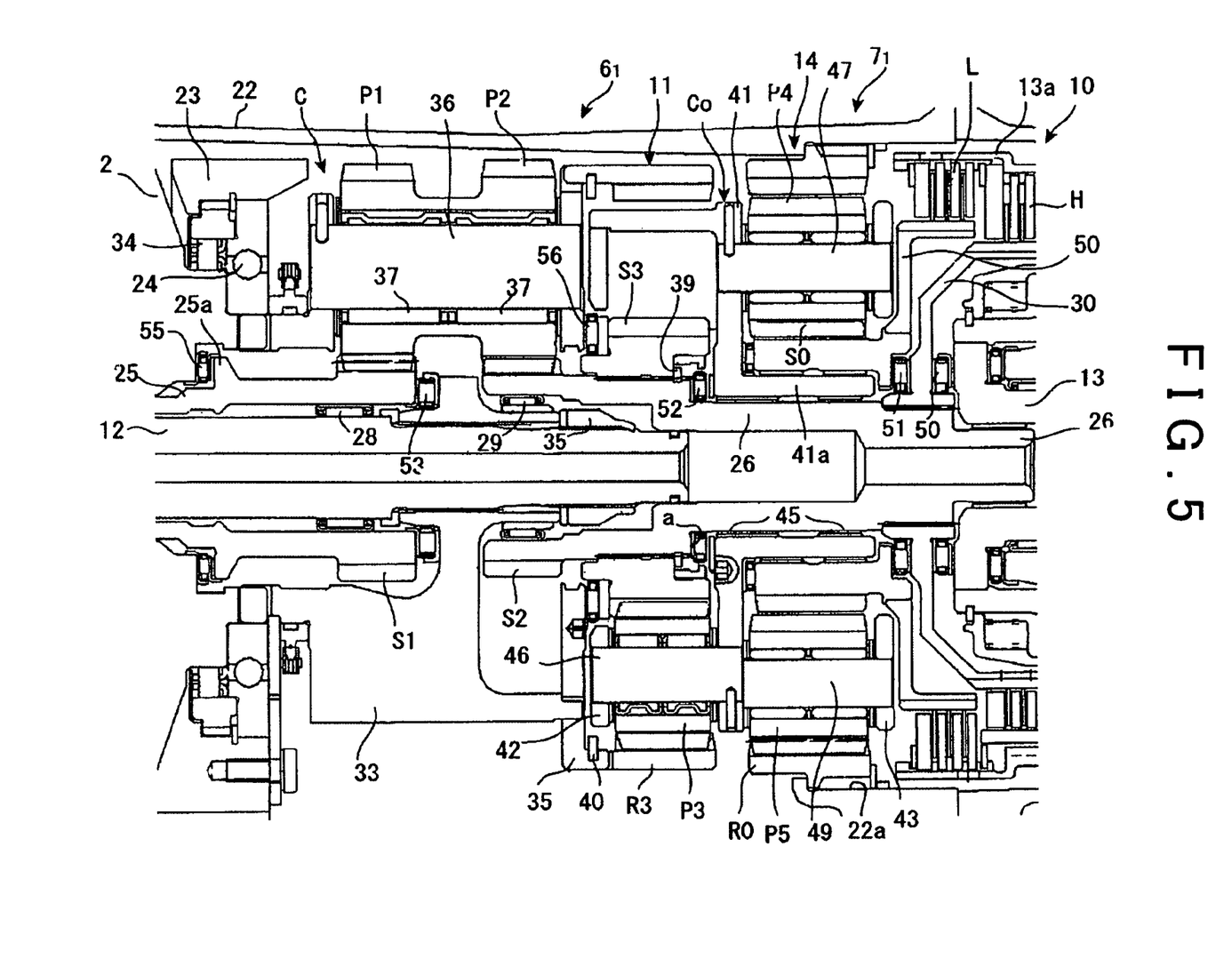
FIG. 5 is a sectional view of a main portion of the embodiment of FIG. 1.

FIG. 5 is a sectional view of the planetary gear mechanism $6_1$ and the counter gear mechanism $7_1$ according to the present invention. The planetary gear mechanism $6_1$ has a front carrier C and a carrier C0 that is shared in common with the counter gear mechanism $7_1$. The front carrier C includes a carrier main body 33 and a carrier cover 35 which is integrally connected to the carrier main body. The carrier main body 33 is rotatably supported via a bearing 24 by an L-shaped plate 23 integrally attached to the transmission case 22. The carrier main body 33 is also connected to one of the input discs 2 of the CVCU, as well as spline-connected to the input shaft 12, which extends through the center of the CVCU 5, and is tightened with a nut 35.

The L-shaped plate 23 is integrally formed with a block that houses an actuator that operates the power roller 4 of the CVCU 5. The CVCU 5 and the planetary gear mechanism $6_1$ are assembled as a sub-assembly with the L-shaped plate via the ball-bearing 24. This sub-assembly is then mounted in the case 22. A one-way clutch 34 is mounted adjacent the ball-bearing 24 on the L-shaped plate 23. This one-way clutch 34 prevents reverse rotation of the input disc 2.

A pinion shaft 36 is supported across the carrier main body 33 and the carrier cover 35. This pinion shaft 36 supports the axially spaced first and second pinions P1 and P2. The first pinion P1 and the second pinion P2 are integrally formed together and may have the same number of teeth, but in this embodiment the numbers of teeth differ slightly. Pinions P1, P2 are rotatably supported on the pinion shaft 36 via needle bearings 37, 37 (or bushes). The first pinion P1 is in mesh with the first sun gear S1 and the second pinion P2 is in mesh with the second sun gear S2.

The first sun gear S1 is formed on an end portion of the hollow shaft 25. This hollow shaft 25 is rotatably supported around the input shaft 12 via a needle bearing 28. The hollow shaft 25 is connected at its base end to the output disc 3 of the CVCU 5. The second sun gear S2 is formed on the base end of the intermediate shaft 26. The intermediate shaft 26 is rotatably supported at its base end via a needle bearing 29 around (concentric with) the input shaft 12, and is connected at its distal end (i.e., the rearend) to a clutch hub 30 of the High clutch H of the Low/High switching mechanism 10. A third sun gear S3 is connected to the intermediate shaft 26 by spline engagement and is prevented from slipping off by a snap ring 39. Also, a ring gear R3 is held relative to the carrier cover 35 of the front carrier C by a snap ring 40. The third sun gear S3, the ring gear R3, and the rear carrier C0, which is integral with the counter gear mechanism $7_1$, together form the simple planetary gear unit 11 of the planetary gear mechanism $6_1$.

The output (common) carrier C0 includes a carrier main body 41 that has a boss portion 41a centrally positioned on its radially inner side, and front and rear carrier covers 42, 43 that form left and right side plates. The boss portion 41a of the carrier main body 41 is rotatably supported via a bushing 45 by the intermediate shaft 26. A pinion shaft 46 is non-rotatably supported between the carrier main body 41 and the carrier cover 42. A pinion P3 is rotatably supported on this pinion shaft 46 and is in mesh with the third sun gear S3 and the ring gear R3, and together these elements form the simple planetary gear unit 11.

A first pinion shaft 47 and a second pinion shaft 49 are non-rotatably supported between the carrier main body 41 and the rear carrier cover 43. A fourth pinion P4 is rotatably supported on the first pinion shaft 47, and a fifth pinion P5 is rotatably supported on the second pinion shaft 49. These pinions P4, P5 are in mesh with each other, and one of these pinions (P4) is also in mesh with the sun gear S0 while the other of these pinions (P5) is in mesh with the ring gear R0. Together these form the double pinion planetary gear unit 14 of the counter gear mechanism 7. Further, the ring gear R0 is engaged with splines 22a that are formed on the transmission case 22 and is thereby fixed. A Low clutch hub 50 is integrally formed with the sun gear S0 by welding or the like. The Low clutch L and High clutch H, which are both wet type multiple disc clutches, are interposed between the hubs 30 and 50 and a drum 13a that is formed on the output shaft 13 (see FIG. 1). Together these form the Low/High switching mechanism 10.

As shown in FIG. 5, thrust bearings 50, 51 are axially interposed between the end surface of the output shaft 13 and the end surface of the sun gear S0 and sandwich the High clutch hub 30 therebetween. Also, a thrust bearing 52 is interposed between a shoulder (step) on the intermediate shaft 26 and the carrier main body 41. These thrust bearings axially position the counter gear mechanism $7_1$ and the Low/High switching mechanism 10. Further, a (first) thrust bearing 53 is interposed between the main body 33 of the carrier C, which is axially positioned by the nut 35 on the input shaft 12, and the distal end (to the rear side of the vehicle) of the hollow shaft 25 which extends from the output disc and on which the first sun gear S1 is formed. A thrust bearing 55 is also interposed between a flange portion 25a of the hollow shaft 25 and the rear surface of the input disc 2. In addition, a (second) thrust bearing 56 is interposed between the sun gear S3 and the rear side surface of the carrier cover 35.

The CVCU 5 and the planetary gear mechanism $6_1$ are structures which are supported such that thrust is cancelled out, with the input shaft 12 and the front carrier C which is integral with the input shaft 12, together with the output disc 3 and the hollow shaft 25, which is axially positioned by the thrust bearings 53, 55, 56, being integrated into a single unit. Further, the pinion and sun gear (S1/P1) (S2/P2) which are in mesh with each other in the planetary gear mechanism $6_1$ are helical gears, so that thrust forces from these gears cancel each other out when power is being transmitted. That is, the thrust generated in the first sun gear S1 acts in the direction toward the right in the drawing (i.e., toward the rear of the vehicle) on the carrier C via the thrust bearing 53, while the thrust from the second sun gear S2 acts in the direction toward the left in the drawing (i.e., toward the front of the vehicle) on the third sun gear S3 via the intermediate shaft 26 and the snap ring 39, and further, acts in the direction toward the left in the drawing (i.e., toward the front of the vehicle) on the carrier C via the thrust bearing 56. Accordingly, the thrust forces of the first and second sun gears S1, S2 act against each other and therefore cancel each other out in the carrier C. Also, because the thrust of the second sun gear S2 acts on the carrier C via the thrust bearing 56 and the snap ring 39 that positions the third sun gear S3, a thrust bearing does not need to be provided between the second sun gear S2 and the carrier main body 33, in opposition to the thrust bearing 53. Thus, the number of thrust bearings can be reduced and the continuously variable transmission can be made more compact in its axial dimension. Therefore, the two input discs 2, 2 are supported such that the large thrust forces (squeezing force) therebetween that are generated in the CVCU 5 cancel each other out. Thus, the CVCU 5 and the planetary gear mechanism $6_1$ are supported as a single system in which all generated thrust is canceled out.

The pinion shaft 36 is shorter than the step pinion shown in FIG. 7, i.e. just long enough to support the two pinions P1, P2. Further, the Low mode output gear unit is the simple planetary gear unit 11, so there is little restriction of the gear ratio, thus aiding the function as an IVT $1_2$ and the pinion shaft 36 can have a large diameter. As a result, the bearing 37 can have a larger diameter which increases its life span and the pinion shaft 36 has improved rigidity which reduces load fluctuations on the bearing due to bending of the shaft. In addition, the weight of the pinions is reduced which reduces the load generated as centrifugal force. As a result of these factors, the precision with which the pinions P1, P2 are supported can be maintained over an extended period of time.

Also, the CVCU 5 and the planetary gear mechanism $6_1$ are supported as an integrated system such that the thrust forces acting on the first and second sun gears S1, S2, that are in mesh with the first and second pinions P1, P2, are cancelled out within the planetary gear mechanism $6_1$. As a result, in combination with the thrust being cancelled out by the integrated structure of the CVCU input disc 2, the carrier C and the input shaft 12, the thrust load on the case 22 of the infinitely variable transmission $1_2$ is also reduced.

Further, the counter gear mechanism $7_1$ and the simple planetary gear unit 11 of the planetary gear mechanism $6_1$ use the same carrier C0. As a result, the planetary gear mechanism $6_1$ and the counter gear mechanism are connected in rational manner. These two factors enable the infinitely variable transmission $1_2$ to be made more compact both axially and radially.

The above-described structure provides improved precision in an infinitely variable transmission (IVT) and thus extends its service life. In addition, the infinitely variable transmission (IVT) can be made more compact.

While the embodiment described above is a full toroidal-type continuously variable speed change unit, alternatively, the invention may be embodied in a half toroidal-type continuously variable speed change. Also, in the above-described embodiment, the simple planetary gear unit 11 has a short, logical connective configuration, with the ring gear R3 connected to the front carrier C and the sun gear S3 connected to the second sun gear S2, but the present invention is not limited to such a configuration, as other connection configurations are also possible.

Although the present invention has been described above with reference to specific embodiments, the present invention is not limited to those specific embodiments described above, but various modifications are possible without departing from the spirit and scope of the invention.

What is claimed is:

1. A continuously variable transmission comprising a toroidal-type continuously variable speed change unit, a planetary gear mechanism, a counter gear mechanism, and a Low/High switching mechanism, wherein:

the planetary gear mechanism comprises a first carrier, first and second pinions which are supported by the carrier, which are axially spaced and which rotate together as an integral unit, a first sun gear that is in mesh with the first pinion, a second sun gear that is in mesh with the second pinion, and one simple planetary gear unit including a first element, a second element, and a third element, wherein the first carrier is connected to the first element of the simple planetary gear unit and the second sun gear is connected to the second element of the simple planetary gear unit;

rotation of an input shaft is input to the first carrier, and output rotation, which is the rotation of the input shaft after the direction and speed thereof have been changed by the toroidal-type continuously variable speed change unit, is input to the first sun gear; and the Low/High switching mechanism provides a Low mode, wherein rotation of the third element of the simple planetary gear unit is reversed in direction by the counter gear mechanism and output to an output shaft, and a High mode wherein rotation of the second sun gear is output to the output shaft.

2. The continuously variable transmission according to claim 1, wherein the first element of the simple planetary gear unit is a ring gear, the second element is a sun gear, and the third element is a carrier.

3. The continuously variable transmission according to claim 2, wherein the counter gear mechanism includes a double pinion planetary gear unit that includes a third carrier, third and fourth pinions supported by the carrier and in mesh with each other, a fourth sun gear that is in mesh with the third pinion, and a second ring gear that is in mesh with the fourth pinion; wherein the carrier of the simple planetary gear unit in the planetary gear mechanism and the third carrier are integrally formed; and wherein, in the Low mode, rotation of the fourth sun gear is transmitted to the output shaft while the second ring gear is held against rotation.

4. The continuously variable transmission according to claim 2, wherein the counter gear mechanism includes a double pinion planetary gear unit having a third carrier, third and fourth pinions that are supported by the third carrier and that are in mesh with each other, a fourth sun gear that is in mesh with the third pinion, and a second ring gear that is in mesh with the fourth pinion; wherein the carrier of the simple planetary gear unit in the planetary gear mechanism and the fourth sun gear are connected; and wherein, in the Low mode, rotation of the third carrier is transmitted to the output shaft while the second ring gear is held against rotation.

5. The continuously variable transmission according to claim 1 wherein the toroidal-type continuously variable speed change unit comprises two input discs, an output disc positioned between the two input discs, and rollers sandwiched between the input discs and the output disc; wherein the two input discs, the input shaft, and the first carrier of the planetary gear mechanism are all formed into one substantially integral structure; wherein the continuously variable speed change unit and the planetary gear mechanism are supported in a manner canceling out axial thrust; and wherein thrust bearings are axially positioned between the first and second sun gears and the first carrier or input shaft.

6. The continuously variable transmission according to claim 5, wherein: a first thrust bearing is interposed between the first sun gear and the first carrier; a second thrust bearing is interposed between the first carrier and the sun gear of the simple planetary gear unit; and thrust from the first sun gear that acts on the first carrier and thrust from the second sun gear, that acts via the third sun gear, act against each other with substantially the same force on the first and second thrust bearings.

7. The continuously variable transmission according to claim 2 wherein the toroidal-type continuously variable speed change unit comprises two input discs, an output disc positioned between the two input discs, and rollers sandwiched between the input discs and the output disc; wherein the two input discs, the input shaft, and the first carrier of the planetary gear mechanism are all formed into one substantially integral structure; wherein and the continuously variable speed change unit and the planetary gear mechanism are supported in a manner canceling out axial thrust; and wherein thrust bearings are axially positioned between the first and second sun gears and the first carrier or input shaft.

8. The continuously variable transmission according to claim 7, wherein: a first thrust bearing is interposed between the first sun gear and the first carrier; a second thrust bearing is interposed between the first carrier and the sun gear of the simple planetary gear unit; and thrust from the first sun gear that acts on the first carrier and thrust from the second sun gear, that acts via the third sun gear, act against each other with substantially the same force on the first and second thrust bearings.

9. The continuously variable transmission according to claim 3 wherein the toroidal-type continuously variable speed change unit comprises two input discs, an output disc positioned between the two input discs, and rollers sandwiched between the input discs and the output disc; wherein the two input discs, the input shaft, and the first carrier of the planetary gear mechanism are all formed into one substantially integral structure; wherein the continuously variable speed change unit and the planetary gear mechanism are supported in a manner canceling out axial thrust; and wherein thrust bearings are axially positioned between the first and second sun gears and the first carrier or input shaft.

10. The continuously variable transmission according to claim 9 wherein: a first thrust bearing is interposed between the first sun gear and the first carrier; a second thrust bearing is interposed between the first carrier and the sun gear of the simple planetary gear unit; and thrust from the first sun gear that acts on the first carrier and thrust from the second sun gear, that acts via the third sun gear, act against each other with substantially the same force on the first and second thrust bearings.

11. The continuously variable transmission according to claim 4 wherein the toroidal-type continuously variable speed change unit comprises two input discs, an output disc positioned between the two input discs, and rollers sandwiched between the input discs and the output disc; wherein the two input discs, the input shaft, and the first carrier of the planetary gear mechanism are all formed into one substantially integral structure; wherein the continuously variable speed change unit and the planetary gear mechanism are supported in a manner canceling out axial thrust; and wherein thrust bearings are axially positioned between the first and second sun gears and the first carrier or input shaft.

12. The continuously variable transmission according to claim 11, wherein: a first thrust bearing is interposed between the first sun gear and the first carrier; a second thrust bearing is interposed between the first carrier and the sun gear of the simple planetary gear unit; and thrust from the first sun gear that acts on the first carrier and thrust from the second sun gear, that acts via the third sun gear, act against each other with substantially the same force on the first and second thrust bearings.

* * * * *